(12) United States Patent
Park et al.

(10) Patent No.: US 9,007,472 B2
(45) Date of Patent: Apr. 14, 2015

(54) REFERENCE IMAGE SETTING APPARATUS AND METHOD, AND IMAGE STABILIZING APPARATUS INCLUDING THE SAME

(75) Inventors: Sang-Ji Park, Changwon (KR); Je-Youl Chon, Changwon (KR); Ju-Han Bae, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 267 days.

(21) Appl. No.: 13/611,725

(22) Filed: Sep. 12, 2012

(65) Prior Publication Data

US 2013/0176448 A1    Jul. 11, 2013

(30) Foreign Application Priority Data

Jan. 11, 2012  (KR) .................. 10-2012-0003449

(51) Int. Cl.
*H04N 5/228* (2006.01)
*H04N 9/077* (2006.01)
*G03B 17/00* (2006.01)
*H04N 5/232* (2006.01)

(52) U.S. Cl.
CPC .............................. *H04N 5/23267* (2013.01)

(58) Field of Classification Search
CPC .................................................. H04N 5/23248
USPC ......................................... 348/208.6; 396/55
See application file for complete search history.

(56) References Cited

U.S. PATENT DOCUMENTS

| 2007/0071426 A1* | 3/2007 | Chujo et al. ................... 396/55 |
| 2008/0170126 A1* | 7/2008 | Tico et al. .................. 348/208.6 |
| 2010/0214425 A1 | 8/2010 | Huang et al. |

FOREIGN PATENT DOCUMENTS

| JP | 6-348851 A | 12/1994 |
| KR | 10-2010-0014543 A | 2/2010 |
| KR | 10-2010-0021216 A | 2/2010 |
| KR | 10-2010-0107594 A | 10/2010 |

* cited by examiner

*Primary Examiner* — Joel Fosselman
(74) *Attorney, Agent, or Firm* — Sughrue Mion, PLLC

(57) ABSTRACT

An image stabilizing apparatus and method for correcting an image that is shaken due to a movement of a camera is provided. The image stabilizing apparatus includes a reference image setting unit including: a sample frame extract unit which extracts a plurality of image frames taken for a certain period of time from image data generated by photographing an object; and a reference frame extract unit which the plurality of image frames with one another to extract a most stabilized image frame and set the extracted image frame as a reference image frame.

20 Claims, 12 Drawing Sheets

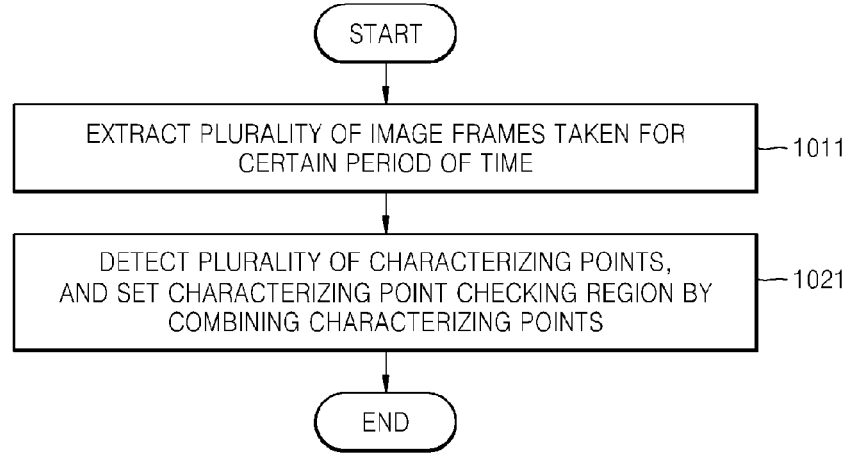
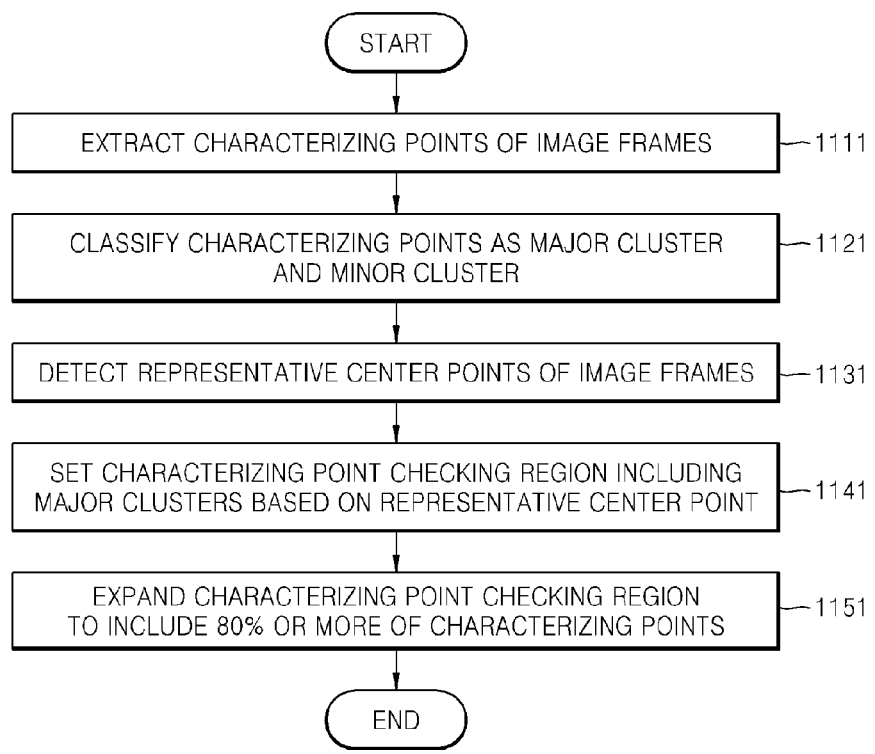

REFERENCE IMAGE SETTING APPARATUS AND METHOD, AND IMAGE STABILIZING APPARATUS INCLUDING THE SAME

CROSS-REFERENCE TO RELATED PATENT APPLICATION

This application claims priority from Korean Patent Application No. 10-2012-0003449, filed on Jan. 11, 2012 in the Korean Intellectual Property Office, the disclosure of which is incorporated herein in its entirety by reference.

BACKGROUND

1. Field

Apparatuses and methods consistent with exemplary embodiments relate to image stabilizing, and more particularly, to image stabilizing through setting a reference images.

2. Description of the Related Art

In order to exactly detect a certain object, in particular, a moving object, by using a camera, each image has to be stabilized. However, it may be difficult to detect a certain object because captured images are shaking due to various external causes. For example, when a certain object is photographed in a state where a camera is exposed to the outside environment, the camera may slightly move due to, for example, wind or external shock. In addition, when the camera is mounted on a movable apparatus, the camera may be shaking due to the movement of the movable apparatus. The shaking of images becomes severe as more external shock is applied to the camera, and eventually the object may not be detected exactly. An image stabilization technology is used to detect an object exactly by stabilizing the shaking images.

A patent (KR 2008-0083525; Method for stabilizing digital image which can correct the horizontal shear distortion and vertical scale distortion) discloses a related-art image stabilization method. According to the related-art image stabilization method, a current frame is corrected by using characterizing points extracted from the current frame and characterizing points extracted from a previous frame. According to the image stabilization method, if a shaking degree of the image increases, image correction may not be stably performed.

SUMMARY

One or more exemplary embodiments provide a reference image setting apparatus and method for setting an image frame that is the least shaken as a reference image, and an image stabilizing apparatus for correcting shaking images by using the reference image.

According to an aspect of an exemplary embodiment, there is provided a reference image setting unit including: a sample frame extract unit which receives a plurality of image frames taken for a certain period of time from image data generated by photographing an object; and a reference frame extract unit which compares the plurality of image frames with one another, extracts the least shaken image frame from among the plurality of image frames, and sets the extracted least shaken image frame as a reference image frame.

The reference frame extract unit may include: a center point detector which detects a center point of each image frame of the plurality of image frames; a characterizing point detector which detects a plurality of characterizing points in each image frame; and a reference frame selector which extracts the least shaken image frame from among the plurality of image frames by analyzing distances between the center point and the plurality of characterizing points in each image frame.

According to an aspect of another exemplary embodiment, there is provided a reference image setting method including: receiving a plurality of image frames taken for a certain period of time from image data generated by photographing an object; and comparing the plurality of image frames with one another, extracting a least shaken image frame from among the plurality of image frames using a result of the comparing, and setting the extracted least shaken image frame as a reference image frame.

According to an aspect of still another exemplary embodiment, there is provided an image stabilizing apparatus including: the above reference image setting unit; and an image adjusting unit which compares a currently input image frame of an image of the photographed object with the reference image frame, and adjusts the currently input image frame according to a shaken degree of the currently input image frame in view of the reference image frame.

The image stabilizing apparatus may further include: a characterizing point checking region setting unit which sets a characterizing point checking region comprising a plurality of characterizing points in the image, wherein, in the characterizing point checking region, the image adjusting unit calculates an optical flow, and moves the currently input image frame using the optical flow.

BRIEF DESCRIPTION OF THE DRAWINGS

The above and other aspects will become more apparent by describing in detail exemplary embodiments thereof with reference to the attached drawings, in which:

FIG. 10 is a flowchart illustrating a method of setting a characterizing point checking region performed by the characterizing point checking region setting unit shown in FIG. 6, according to an exemplary embodiment;

FIG. 11 is a flowchart illustrating a second operation of the method shown in FIG. 10 in detail, according to an exemplary embodiment;

DETAILED DESCRIPTION

Figure 1:
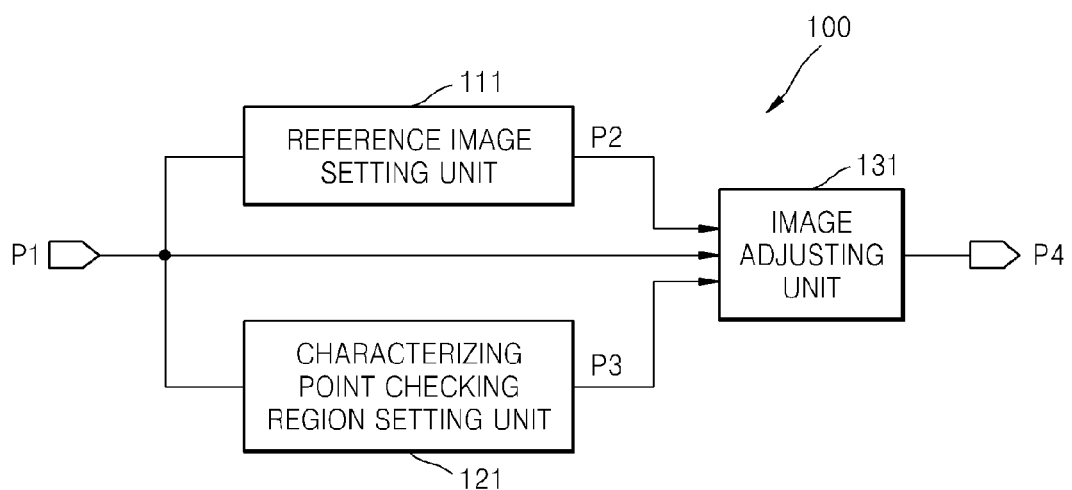
FIG. 1 is a block diagram of an image stabilizing apparatus according to an exemplary embodiment.

Hereinafter, exemplary embodiments of the inventive concept will be described in detail with reference to accompanying drawings. Like reference numerals denote like elements.

FIG. 1 is a block diagram of an image stabilizing apparatus 100 according to an exemplary embodiment. The image stabilizing apparatus 100 receives image data P1 that is generated by a camera (not shown) photographing an object, and stabilizes images included in the image data P1. When the object is continuously photographed by the camera in a state of being fixed, obtained images are stabilized. However, if the object is photographed in a state where the camera is shaking, obtained images are also shaken, and accordingly the photographed object may not exactly be distinguished from other objects or an environment. When the images are shaken as described above, the image stabilizing apparatus 100 stabilizes the image by moving the shaking object to an original position.

Referring to FIG. 1, the image stabilizing apparatus 100 includes a reference image setting unit 111, a characterizing point checking region setting unit 121, and an image adjusting unit 131.

The reference image setting unit 111 extracts an image frame that is shaken least among a plurality of image frames included in the image data P1 generated by photographing the object, and then, sets the extracted image frame as a reference image frame. The reference image setting unit 111 outputs a signal P2 representing the reference image frame to the image adjusting unit 131. The reference image setting unit 111 is described in more detail below with reference to FIGS. 2 through 5.

The characterizing point checking region setting unit 121 receives the image data P1 input from outside, and sets a characering point checking region. The characterizing point checking region setting unit 121 generates a signal P3 representing the characterizing point checking region, and outputs the signal P3 to the image adjusting unit 131. The characterizing point checking region setting unit 121 will be described in detail with reference to FIGS. 6 through 11.

The image adjusting unit 131 receives the signals P2 and P3. The image adjusting unit 131 sets the characterizing point checking region in an image frame included in the image data P1 that is currently input, and compares the currently input image frame with the reference image frame so as to adjust and stabilize the currently input image frame according to a shaken degree of the image frame when the currently input image frame is shaken. The image adjusting unit 131 is described in more detail below with reference to FIGS. 12 through 17.

Figure 2:
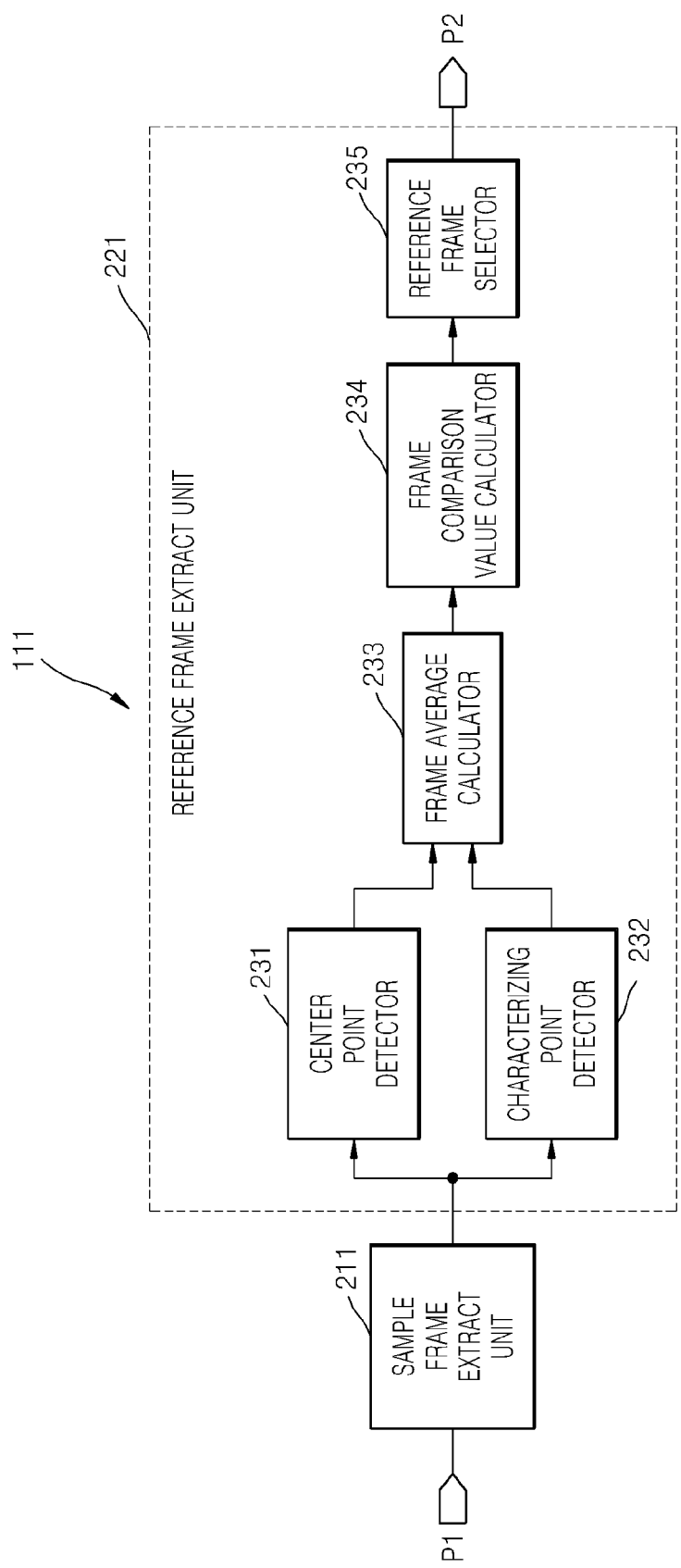
FIG. 2 is a detailed block diagram of a reference image setting unit shown in FIG. 1, according to an exemplary embodiment.

FIG. 2 is a detailed block diagram of the reference image setting unit 111 shown in FIG. 1. Referring to FIG. 2, the reference image setting unit 111 includes a sample frame extract unit 211 and a reference frame extract unit 221.

Figure 3:
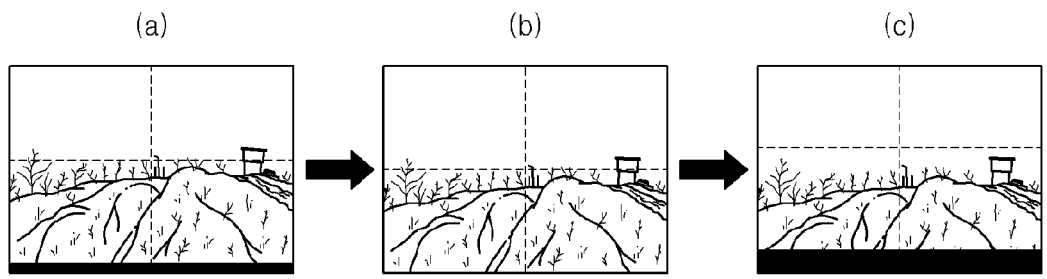
FIG. 3 is a diagram showing examples of shaken image frames and stabilized image frames.

The sample frame extract unit 211 receives the image data P1 from outside. The image data P1 is generated by continuously photographing an object with the camera. The image data P1 includes a plurality of image frames. For example, the image data P1 includes image frames a, b, and c, each including a building located on a right side of the image frame, as shown in FIG. 3. In FIG. 3, the image frames a and c show states where images are shaken vertically relative to the image frame b. The sample frame extract unit 211 extracts a plurality of image frames taken for a certain time period from the image data P1. The image data P1 includes hundreds to tens of thousands of image frames per second according to the performance of the camera. Therefore, the certain period of time may be set as 1 second or shorter if the shutter speed of the camera is fast, and may be set to be longer than 1 second if the shutter speed of the camera is slow. However, the present embodiment is not limited to this example.

The reference frame extract unit 221 receives the plurality of image frames extracted by the sample frame extract unit 211, and compares the received image frames with one another to extract the most stabilized image frame, and sets the most stabilized image frame as a reference image frame. The most stabilized image frame is an image frame of which a shaking degree is the least.

The reference frame extract unit 221 includes a center point detector 231, a characterizing point detector 232, a frame average calculator 233, a frame comparison value calculator 234, and a reference frame selector 235.

The center point detector 231 receives the plurality of image frames from the sample frame extract unit 211, and detects center points of the plurality of image frames. That is, the center point detector 231 detects one center point from each of the plurality of image frames. The center point is located at a center of the image frame and may be represented as coordinates.

The characterizing point detector 232 receives the plurality of image frames from the sample frame extract unit 211, and detects a plurality of characterizing points in the plurality of image frames. That is, the characterizing point detector 232 detects the plurality of characterizing points in each of the plurality of image frames. The plurality of characterizing points may be represented as coordinates. The image frame includes various characterizing elements, some of which may be detected as the characterizing points according to needs of a user. In order to detect the characterizing points of the image frame, a Harris' corner detection method, a scale invariant feature transform (SIFT) algorithm, or a speeded-up robust feature (SURF) algorithm may be used.

The frame average calculator 233 receives the plurality of center points detected by the center point detector 231 and the plurality of characterizing points detected by the characterizing point detector 232, and calculates a plurality of frame averages. Each of the plurality of frame averages for each image frame may be obtained by averaging distances between a center point of each frame and a plurality of characterizing points in each image frame. When the number of image frames is N (N is an integer), N frame averages may be calculated.

The frame comparison value calculator 234 receives the plurality of frame averages from the frame average calculator 233, and calculates a plurality of frame comparison values. Each of the plurality of frame comparison values may be obtained by summing up absolute values, which are obtained by subtracting frame averages of other image frames from a frame average of a corresponding image frame. If the number of the frame averages is N, the number of the frame comparison values is also N. The frame comparison value Pk (k is an integer) of each of the plurality of image frames may be calculated by the following equation 1.

$$Pk=abs\{Rk-R0\}+abs\{Rk-R1\}+\ldots+abs\{Rk-Rn\} \quad (1),$$

where abs denotes an absolute value.

For example, if the number of extracted image frames for the certain period of time is five, five frame averages R0 to R4 are calculated, and five frame comparison values P0 to P4 may be obtained as the following equations 2 through 6.

$$P0=abs\{R0-R1\}+abs\{R0-R2\}+abs\{R0-R3\}+abs\{R0-R4\} \quad (2)$$

$$P1=abs\{R1-R0\}+abs\{R1-R2\}+abs\{R1-R3\}+abs\{R1-R4\} \quad (3)$$

$$P2=abs\{R2-R0\}+abs\{R2-R1\}+abs\{R2-R3\}+abs\{R2-R4\} \quad (4)$$

$$P3=abs\{R3-R0\}+abs\{R3-R1\}+abs\{R3-R2\}+abs\{R3-R4\} \quad (5)$$

$$P4=abs\{R4-R0\}+abs\{R4-R1\}+abs\{R4-R2\}+abs\{R4-R3\} \quad (6)$$

The reference frame selector 235 receives the plurality of frame comparison values and selects an image frame having the smallest frame comparison value among the plurality of frame comparison values. The image frame having the smallest value is set as the reference value. The smallest frame comparison value represents that the image is least shaken.

As described above, the reference image setting unit 111 extracts the plurality of image frames for the certain period of time from the image data P1 input from outside, detects the image frame having the least degree of shaking among the extracted image frames, and sets the detected image frame as the reference image frame.

Figure 4:
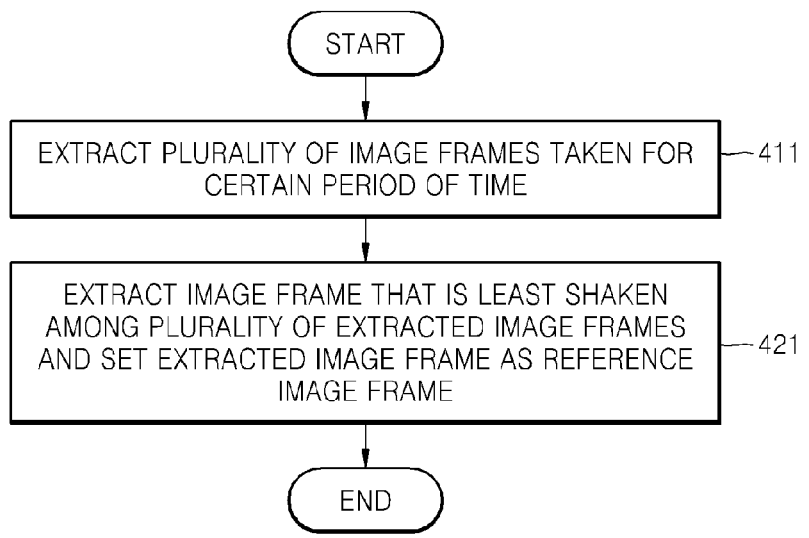
FIG. 4 is a flowchart illustrating a method of setting a reference image performed by the reference image setting unit shown in FIG. 2, according to an exemplary embodiment.

FIG. 4 is a flowchart illustrating a method of setting the reference image frame by the reference image setting unit 111 of FIG. 2. Referring to FIG. 2, the method of setting the reference image frame includes operation S411 and operation S421.

In operation S411, the reference image setting unit 111 extracts the plurality of image frames taken for a certain period of time among the plurality of image frames included in the image data P1 input from outside.

In operation S421, the reference image setting unit 111 compares the plurality of extracted image frames with one another to detect and set the image frame that is the most stabilized as the reference image frame. The most stabilized image frame denotes an image frame, of which a shaking degree is the least among the image frames.

Figure 5:
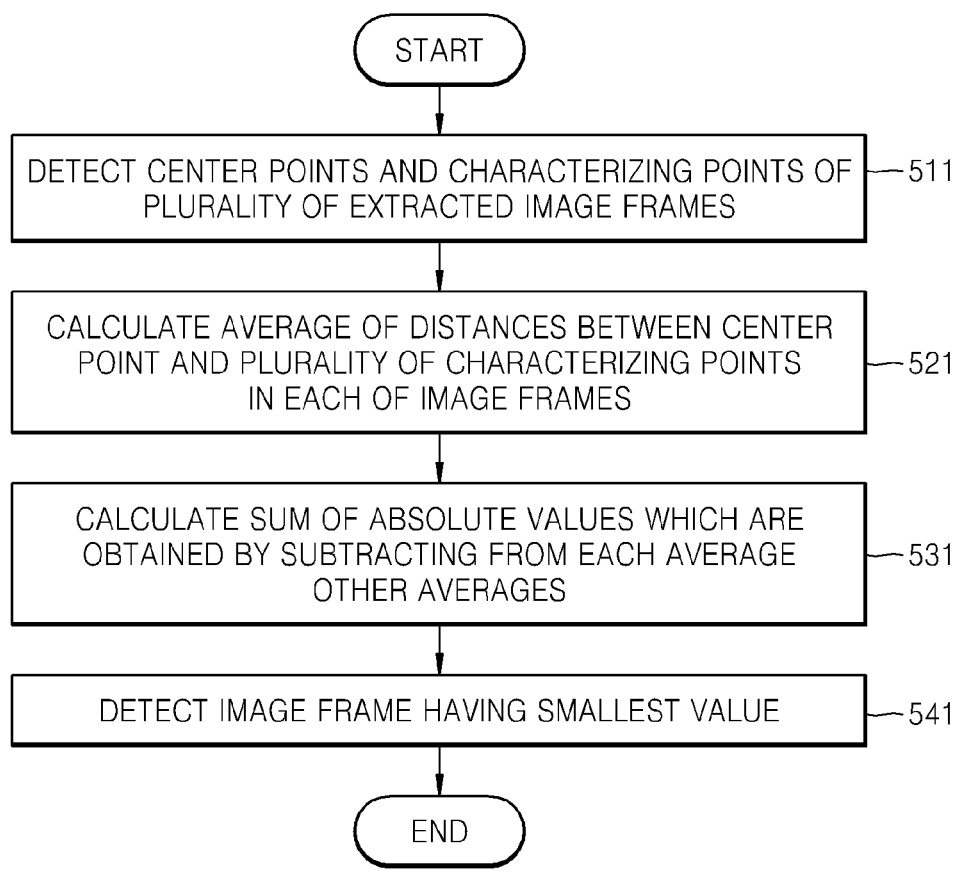
FIG. 5 is a flowchart illustrating an operation of the method shown in FIG. 4 in detail, according to an exemplary embodiment.

FIG. 5 is a flowchart illustrating the operation S421 of FIG. 4 in more detail. Referring to FIG. 5, the operation S421 of FIG. 4 includes four sub-operations S511 through S541.

In operation S511, the reference image setting unit 111 extracts the center point and the plurality of characterizing points from each of the plurality of extracted image frames.

In operation S521, the reference image setting unit 111 calculates an average of distances between the center point and the plurality of characterizing points in each of the image frames, that is, a frame average.

In operation S531, the reference image setting unit 111 calculates a sum of absolute values that are obtained by subtracting other frame averages from the frame average of each image frame, that is, a frame comparison value. That is, the reference image setting unit 111 calculates the plurality of frame comparison values by using equation 1 above.

In operation S541, the reference image setting unit 111 detects an image frame having the smallest frame comparison value among the plurality of frame comparison values and sets the detected image frame as the reference image frame.

Therefore, the reference image setting unit 111 detects the image frame of which a shaking degree is the least among the plurality of image frames included in the image data P1 and then sets the detected image as the reference image frame.

Figure 6:
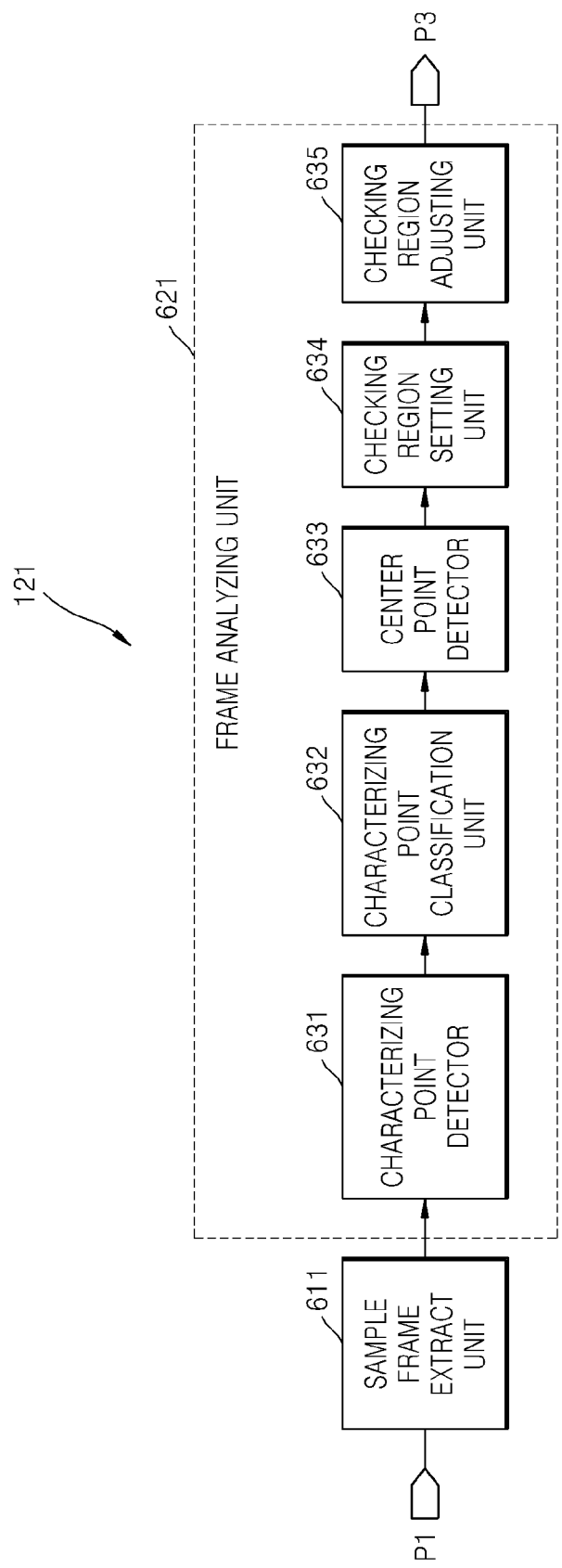
FIG. 6 is a detailed block diagram of a characterizing point checking region setting unit shown in FIG. 1, according to an exemplary embodiment.

FIG. 6 is a detailed block diagram of the characterizing point checking region setting unit 121 shown in FIG. 1. Referring to FIG. 6, the characterizing point checking region setting unit 121 includes a sample frame extract unit 611 and a frame analyzing unit 621.

The sample frame extract unit 611 receives the image data P1 from outside. The image data P1 includes a plurality of image frames that are generated by photographing an object continuously. The sample frame extract unit 611 extracts a plurality of image frames taken for a certain time period among the plurality of image frames included in the image data P1. The image data P1 generated by photographing the object with the camera includes hundreds to tens of thousands of image frames per second according to the performance of the camera. Therefore, the certain period of time may be set as 1 second or shorter if the shutter speed of the camera is fast, and may be set to be longer than 1 second if the shutter speed of the camera is slow. However, the present embodiment is not limited to this example.

The frame analyzing unit 621 receives the plurality of image frames that are extracted for the certain period of time from the sample frame extract unit 611. The frame analyzing unit 621 detects a plurality of characterizing points in the plurality of image frames, and sets an optimal characterizing checking region by using the plurality of characterizing points. The frame analyzing unit 621 outputs a signal P3 representing the characterizing point checking region.

The frame analyzing unit 621 includes a characterizing point detector 631, a characterizing point classification unit 632, a center point detector 633, a checking region setting unit 634, and a checking region adjusting unit 635.

The characterizing point detector 631 receives the plurality of image frames extracted for the certain period of time from the sample frame extract unit 611, and detects a plurality of characterizing points (921 of FIG. 9B) in each of the plurality of image frames. That is, the characterizing point detector 631 detects a plurality of characterizing points (921 of FIG. 9B) in each of the plurality of image frames. Each of the plurality of characterizing points (921 of FIG. 9B) may be represented as coordinates. The image frame includes various characterizing elements, some of which may be detected as the characterizing points (921 of FIG. 9B) according to setting by the user. In order to detect the characterizing points (921 of FIG. 9B) of the image frame, a Harris' corner detection method, a SIFT algorithm, or an SURF algorithm may be used.

Figure 7:
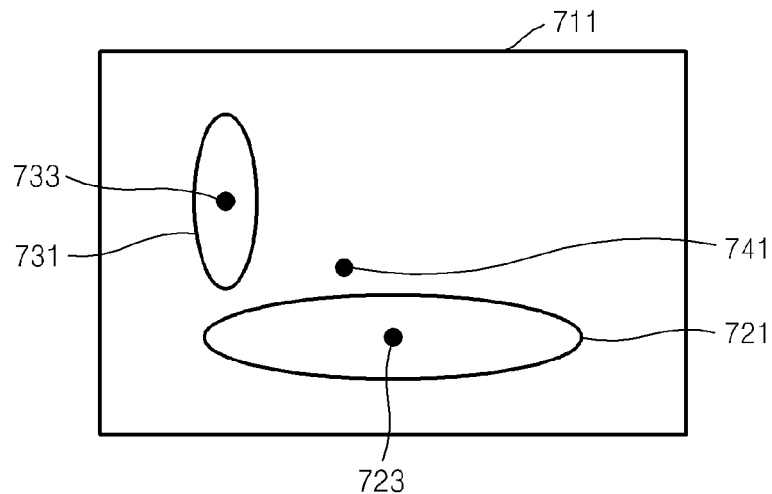
FIG. 7 is a diagram showing examples of detected centroid points according to an exemplary embodiment.

The characterizing point classification unit 632 classifies the plurality of characterizing points (921 of FIG. 9B) detected by the characterizing point detector 631 as a plurality of clusters (721 and 731 of FIG. 7), for example, a major cluster (721 of FIG. 7) and a minor cluster (731 of FIG. 7), for each of the image frames (711 of FIG. 7). The major cluster (721 of FIG. 7) includes 50% or more characterizing points, and the minor cluster (731 of FIG. 7) includes less than 50% of the characterizing points. As described above, since the major cluster (721 of FIG. 7) includes more characterizing points than the minor cluster (731 of FIG. 7), the major cluster 721 may be wider than the minor cluster 731 as shown in FIG. 7. In order to classify the characterizing points (921 of FIG.

9B) as a plurality of clusters (721 and 731 of FIG. 7), a k-mean clustering method and a support vector machine (SVM) method may be used.

Figure 8A:
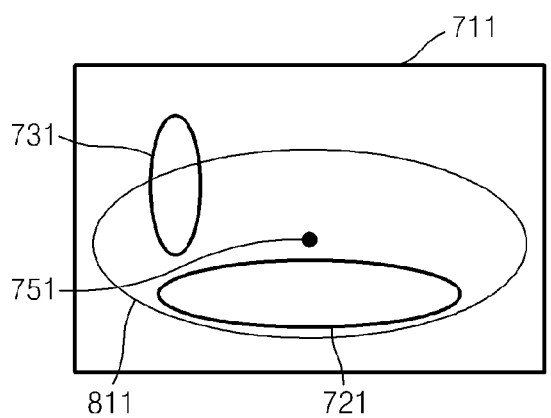
FIGS. 8A and 8B are diagrams illustrating a method of setting a characterizing point checking region, according to an exemplary embodiment.
Figure 8B:
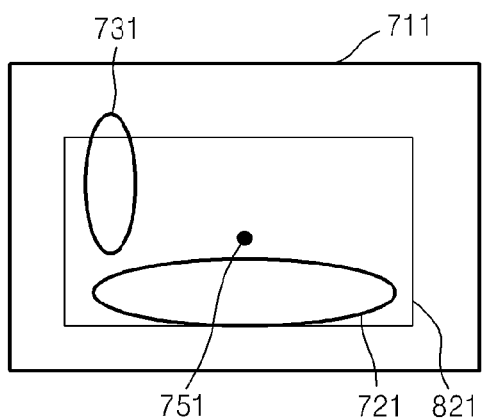

The center point detector 633 detects a centroid point (741 of FIG. 7) of the characterizing points in the plurality of image frames. To do this, the center point detector 633 detects a centroid point (723 of FIG. 7) of the major cluster 721 and a centroid point (733 of FIG. 7) of the minor cluster 731 that are classified by the characterizing point classification unit 632 in each of the image frames (711 of FIG. 7). The center point detector 633 calculates an average between the centroid point (723 of FIG. 7) of the major cluster 721 and the centroid point (733 of FIG. 7) of the minor cluster 731 to detect the centroid point (741 of FIG. 7) in each of the image frames. The centroid point (741 of FIG. 7) in each of the image frames is generally adjacent to the major cluster (721 of FIG. 7) as shown in FIG. 7. The center point detector 633 calculates an average of the centroid points (741 of FIG. 7) of the plurality of image frames, and detects a representative centroid point (751 of FIGS. 8A and 8B) of the plurality of image frames, as shown in FIG. 8. The average of the centroid points (741 of FIG. 7) in the plurality of image frames may be calculated by summing the centroid points (741 of FIG. 7) of the plurality of image frames, and dividing the sum by the number of image frames.

The checking region setting unit 634 sets a characterizing point checking region (811 of FIG. 8A or 821 of FIG. 8B) including all of the major clusters (721 of FIG. 7) of the plurality of image frames based on the representative centroid point (751 of FIGS. 8A and 8B) detected by the center point detector 633, as shown in FIGS. 8A and 8B. The characterizing point checking region 811 or 821 may be formed in various shapes, for example, may be formed as a region 811 denoted by a circle as shown in FIG. 8A or may be formed as a region 821 denoted by a square as shown in FIG. 8B.

Figure 9A:
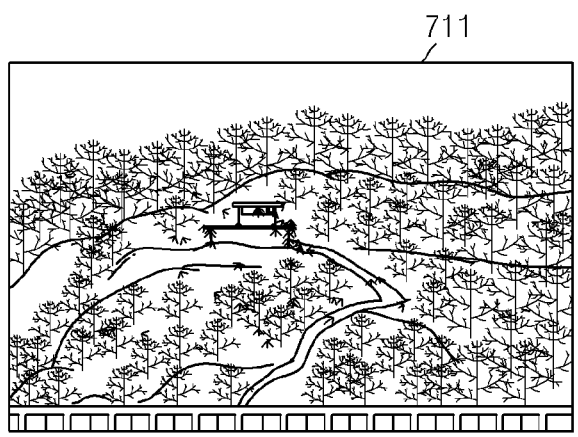
FIGS. 9A and 9B are diagrams of set optimal characterizing point checking regions according to an exemplary embodiment.
Figure 9B:
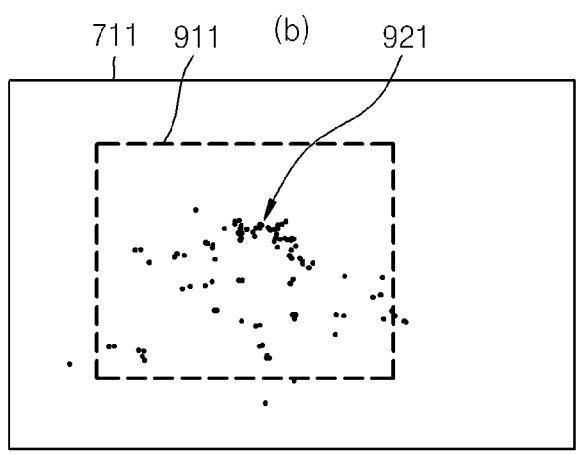

The checking region adjusting unit 635 identifies whether the characterizing point checking region 811 or 821 includes greater than or equal to a predetermined level of the characterizing points (921 of FIG. 9B) of the image frames extracted for the certain period of time. The predetermined level may be set as 80% of the characterizing points 921. The checking region adjusting unit 635 expands the characterizing point checking region 811 or 821 so as to include the predetermined level of characterizing points, if the characterizing points included in the characterizing point checking region 811 or 821 are less than the predetermined level. FIG. 9B shows a state where the adjustment is finished and an optimal characterizing point checking region 911 is set, and FIG. 9A shows one of the plurality of image frames.

As described above, since the characterizing point checking region setting unit 121 sets the optimal characterizing point checking region 911, a time taken to test the characterizing points of the image stabilizing apparatus 100 may be greatly reduced.

FIG. 10 is a flowchart illustrating a method of setting the characterizing point checking region performed by the characterizing point checking region setting unit 121 shown in FIG. 6, according to the embodiment. Referring to FIG. 10, the method includes operation S1011 and operation S1021.

In operation S1011, the characterizing point checking region setting unit (121 of FIG. 6) extracts a plurality of image frames taken for a certain period of time among the plurality of image frames included in the image data (P1 of FIG. 6) input from outside.

In operation S1021, the characterizing point checking region setting unit 121 detects a plurality of characterizing points (921 of FIG. 9) in the plurality of extracted image frames and sets the optimal characterizing point checking region (911 of FIG. 9) by using the plurality of characterizing points 921.

FIG. 11 is a flowchart illustrating the operation S1021 shown in FIG. 10 in more detail. Referring to FIG. 11, the operation S1021 shown in FIG. 10 includes sub-operations S1111 through 1151.

In operation S1111, the characterizing point setting unit 121 extracts a plurality of characterizing points 921 from each of the plurality of extracted image frames.

In operation S1121, the characterizing point checking region setting unit 121 classifies the plurality of detected polarizing points 921 as a plurality of clusters (721 and 731 of FIG. 7), for example, the major cluster 721 and the minor cluster 731, for each of the image frames. The major cluster 721 is set to include 50% or greater of the characterizing points, and the minor cluster 731 is set to include less than 50% of the characterizing points.

In operation S1131, the characterizing point checking region setting unit 121 detects the representative centroid point (751 of FIGS. 8A and 8B) of the plurality of image frames. That is, the characterizing point checking region setting unit 121 detects the centroid points 723 and 733 from each of the plurality of clusters 721 and 731, and calculates the average of the centroid points 723 and 733 of the plurality of clusters 721 and 731 for each of the image frames to detect the centroid point 741 of each of the image frames. In addition, the centroid points 741 of the plurality of image frames are summed, and the sum is divided by the number of image frames to detect the representative centroid point 751 of the plurality of image frames.

In operation S1141, the characterizing point checking region setting unit 121 sets the characterizing point checking region (811 of FIG. 8A or 821 of FIG. 8B) that includes all of the major clusters 721 based on the representative centroid point 751.

In operation S1151, the characterizing point checking region setting unit 121 identifies whether the characterizing point checking region 811 or 821 includes equal to or greater than the predetermined level of characterizing points 921 of the image frames extracted for the certain period of time or greater. When an amount of the characterizing points included in the characterizing point checking region 811 or 821 is less than the predetermined level, the characterizing point checking region setting unit 121 expands the characterizing point checking region 811 or 821 to include the predetermined level of characterizing points. The predetermined level may be set as 80% of the characterizing points 921. Therefore, the optimal characterizing point checking region 911 may be set.

As described above, the characterizing point checking region setting unit 121 sets the optimal characterizing point checking region 911 by using the plurality of image frames included in the image data P1 input from outside, and thus, a time that is taken to check the characterizing points of the image frames is greatly reduced.

Figure 12:
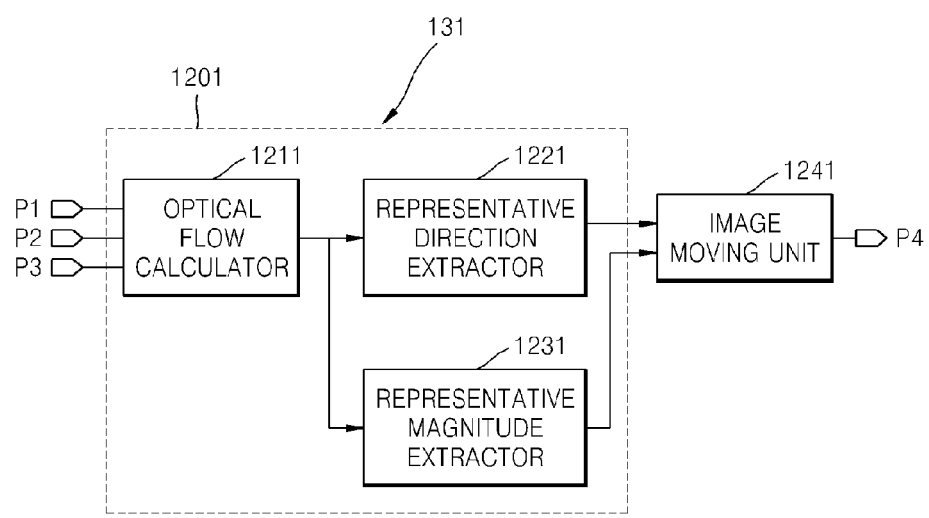
FIG. 12 is a detailed block diagram of an image adjusting apparatus shown in FIG. 1, according to an exemplary embodiment.

FIG. 12 is a detailed block diagram of the image adjusting unit 131 shown in FIG. 1. Referring to FIG. 12, the image adjusting unit 131 includes an image analyzing unit 1201 and an image moving unit 1241.

The image analyzing unit 1201 compares a current image frame included in the image data P1 input from outside with the predetermined reference image frame included in the reference image signal P2, and extracts a representative direction and a representative magnitude of the shaking if the current image frame is shaken.

The image analyzing unit 1201 includes an optical flow calculator 1211, a representative direction extractor 1221, and a representative magnitude extractor 1231.

Figure 13:
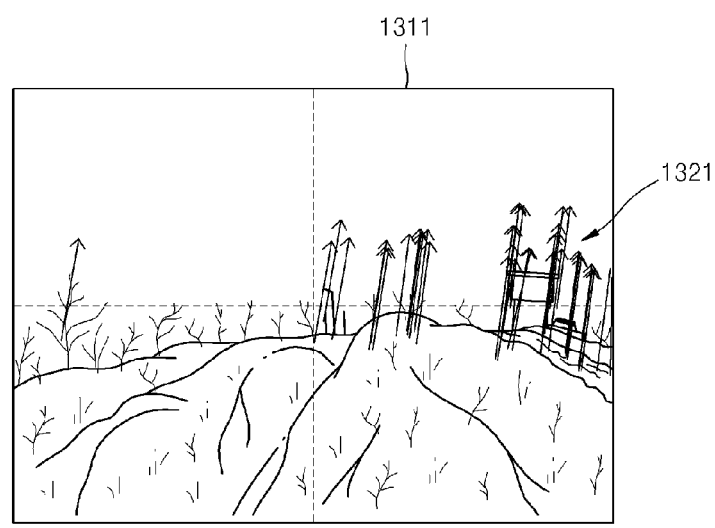
FIG. 13 is an image showing an example of an optical flow according to an exemplary embodiment.
Figure 14:
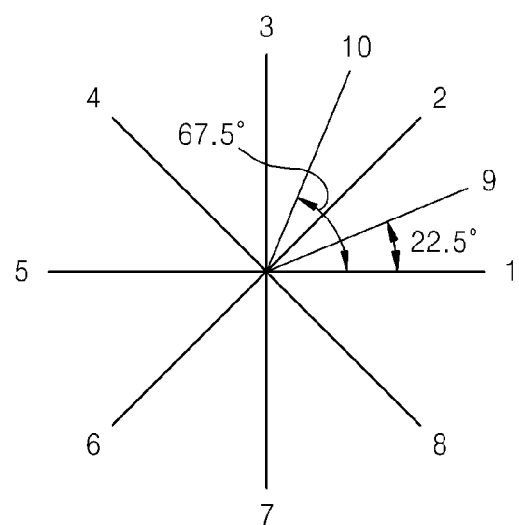
FIG. 14 is a diagram showing representative directions of the optical flow according to an exemplary embodiment.

The optical flow calculator 1211 compares the current image frame with the reference image frame to calculate an optical flow (1321 of FIG. 13) in the characterizing point checking region 911. As shown in FIG. 13, the optical flow 1321 has at least one direction and at least one magnitude. A method of calculating the optical flow 1321 is well known in the art, and thus, detailed descriptions thereof are not provided here. The reference image frame is an image frame of which a shaking degree is the least among the plurality of image frames taken for the certain period of time. The optical flow calculator 1211 may receive the reference image frame from the reference image setting unit shown in FIG. 2. The method of setting the reference image frame is described above with reference to FIGS. 2 through 5.

The representative direction extractor 1221 receives the optical flow 1321 calculated by the optical flow calculator 1211. The representative direction extractor 1221 extracts the representative shaking direction of the currently input image frame from the optical flow 1321. The shaking direction of the image may be set in eight directions, for example, an east direction, a west direction, a south direction, a north direction, a south-east direction, a north-east direction, a south-west direction, and a north-west direction. The representative direction extractor 1221 determines which one of the eight directions is the representative direction of the optical flow 1321, and sets the determined direction as the representative direction of the currently input image frame. The shaking direction of the image may be divided in more detail, for example, 12 directions, 24 directions, or 36 directions.

The representative magnitude extractor 1231 also receives the optical flow 1321 calculated by the optical flow calculator 1211. The representative magnitude extractor 1231 extracts a representative shaking magnitude of the currently input image frame from the optical flow 1321. The representative shaking magnitude of the image frame may be obtained by converting magnitudes of the optical flow having the representative shaking direction into a histogram, and averaging vectors included in a range having the largest number of bins in the histogram.

The image moving unit 1241 moves the currently input image frame as much as the representative magnitude extracted by the representative magnitude extractor 1231 in a direction opposite to the representative direction extracted by the representative direction extractor 1221. That is, the image moving unit 1241 moves the currently input image frame as much as the magnitudes of Table 1 below in the directions shown in Table 1. In Table 1, minus (−) denotes an opposite direction, and the representative directions are the directions shown in FIG. 14.

TABLE 1

| Representative direction | coordinates of moving the current image frame (X-axis, Y-axis) |
| --- | --- |
| 1 | −representative magnitude, 0 |
| 2 | −(representative magnitude/$\sqrt{2}$), −(representative magnitude/$\sqrt{2}$) |
| 3 | 0, −representative magnitude |
| 4 | (representative magnitude/$\sqrt{2}$), −(representative magnitude/$\sqrt{2}$) |
| 5 | Representative magnitude, 0 |
| 6 | (representative magnitude/$\sqrt{2}$), (representative magnitude/$\sqrt{2}$) |
| 7 | 0, representative magnitude |
| 8 | −(representative magnitude/$\sqrt{2}$), (representative magnitude/$\sqrt{2}$) |

Figure 15:
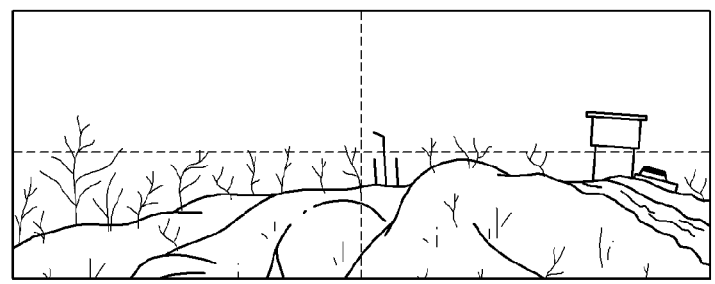
FIG. 15 is an image showing a state where an image is adjusted according to an exemplary embodiment.

Referring to Table 1, the image moving unit 1241 moves the current image frame on the X-axis as much as the representative magnitude in the opposite direction to the representative direction, when the representative direction is an X-axis (1, 5). In addition, the image moving unit 1241 moves the current image frame on the Y-axis as much as the representative magnitude in the opposite direction to the representative direction when the representative direction is a Y-axis (3, 7). However, when the representative direction is a diagonal direction (2, 4, 6, 8), the image moving unit 1241 moves the current image frame in a diagonal line as much as (representative magnitude/$\sqrt{2}$) in the opposite direction by using trigonometric functions. After that, four sides of the moved current image frame are trimmed in consideration of the representative direction and the representative magnitude. Therefore, the image may be stabilized as shown in FIG. 15. The image moving unit 1241 outputs a signal P4 representing the stabilized image.

Figure 16A:
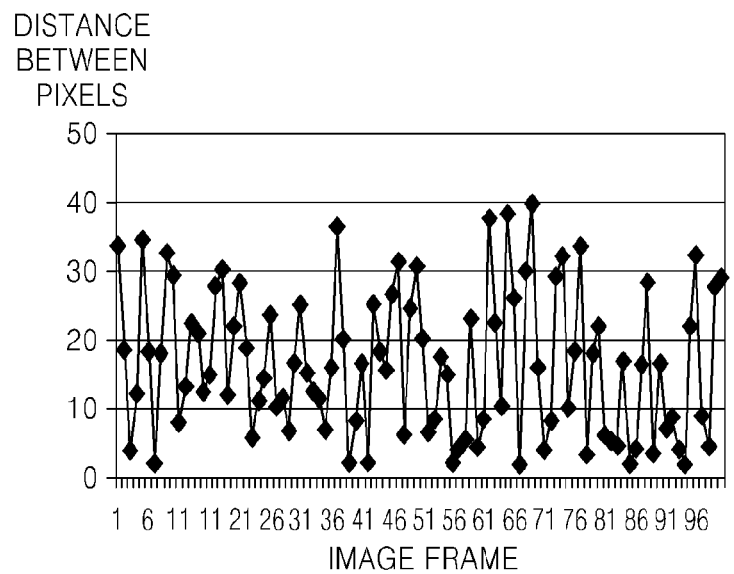
FIGS. 16A and 16B are graphs showing shaken degrees of an image, according to an exemplary embodiment.
Figure 16B:
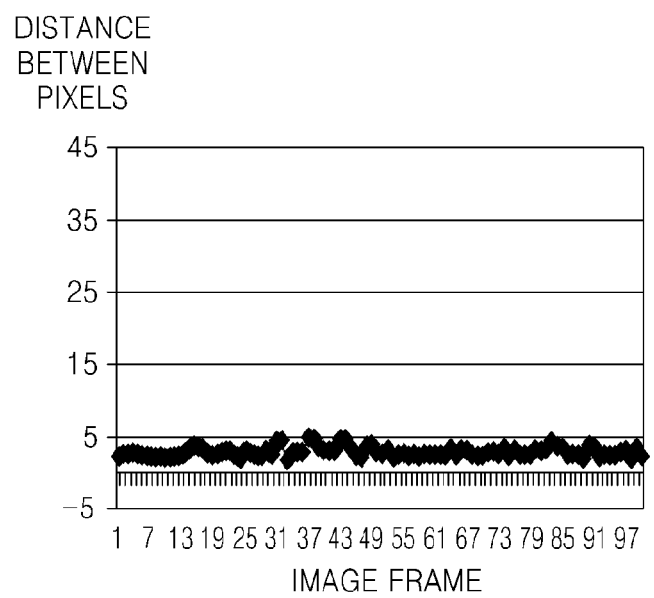

FIGS. 16A and 16B are graphs showing the shaken degree of the image. FIG. 16A shows the shaken degree of the image before stabilization, and FIG. 16B shows the shaken degree of the image after stabilization.

Referring to FIG. 16A, large deviation is shown between locations of pixels in the image frames. That is, FIG. 16A shows a state where the image is severely shaken and is unstable.

Referring to FIG. 16B, small deviation is shown between locations of the pixels in the image frames. That is, FIG. 16B shows a state where the image is stabilized.

As described above, the optical flow of the image frame input to the image adjusting unit 131 is calculated to extract the representative direction and the representative magnitude of the image frame. Then, if the image frame is shaken, the image frame is moved as much as the representative magnitude in the opposite direction to the representative direction. Thus, the shaking may be corrected and the image frame may be stabilized.

Figure 17:
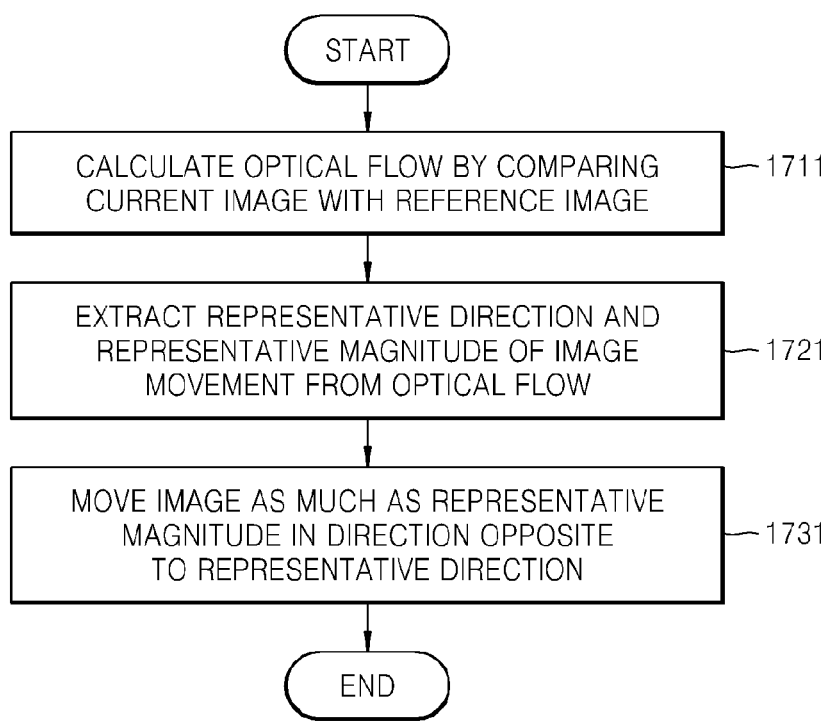
FIG. 17 is a flowchart illustrating a method of adjusting an image performed by the image adjusting apparatus of FIG. 12, according to an exemplary embodiment.

FIG. 17 is a flowchart illustrating a method of adjusting the image by the image adjusting unit 131 shown in FIG. 12, according to an exemplary embodiment. Referring to FIG. 17, the method of adjusting the image includes operations S1711 through S1731.

In operation S1711, the image adjusting unit 131 compares the current image frame input from outside with the preset reference image frame to calculate the optical flow (1321 of FIG. 13). The reference image frame is input from outside to the image adjusting unit 131.

In operation S1721, the image adjusting unit 131 extracts the representative direction and the representative magnitude of the shaking of the currently input image frame from the optical flow 1321.

In operation S1731, the image adjusting unit 131 moves the image frame that is currently input as much as the representative magnitude in the opposite direction to the representative direction. In more detail, if the representative direction is an X-axis direction, the image adjusting unit 131 moves the current image frame as much as the representative magnitude in the opposite direction to the representative direction on the X-axis. If the representative direction is a Y-axis direction, the image adjusting unit 131 moves the current image frame as much as the representative magnitude in the opposite direction to the representative direction on the Y-axis. However, when the representative direction is a diagonal direction, the image adjusting unit 131 moves the current image frame as much as (representative magnitude/$\sqrt{2}$) in the opposite direction to the representative direction on the diagonal line. After that, the four sides of the moved current image frame are trimmed in consideration of the representative direction and the representative magnitude. Therefore, the shaking is corrected, and the stabilized image may be obtained as shown in FIG. 15.

According to the exemplary embodiments, the image frame, the shaking degree of which is the least, is extracted and set as the reference image frame, and the currently input image frame is compared with the reference image frame to exactly determine the shaking degree of the currently input image frame.

In addition, the image frame is corrected according to the shaking degree, the image may be optimally stabilized.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A reference image setting unit comprising:
   a sample frame extract unit which receives a plurality of image frames taken for a certain period of time from image data generated by photographing an object; and
   a reference frame extract unit which compares the plurality of image frames with one another based on distances between a center point and a plurality of characterizing points in each image frame, extracts the least shaken image frame from among the plurality of image frames according to a result of the comparison, and sets the extracted least shaken image frame as a reference image frame.

2. The reference image setting unit of claim 1, wherein the plurality of image frames are generated by continuously photographing the object.

3. The reference image setting unit of claim 1, wherein the reference frame extract unit comprises:
   a center point detector which detects the center point of each image frame of the plurality of image frames;
   a characterizing point detector which detects the plurality of characterizing points in each image frame; and
   a reference frame selector which extracts the least shaken image frame from among the plurality of image frames by analyzing the distances between the center point and the plurality of characterizing points in each image frame.

4. The reference image setting unit of claim 3, further comprising:
   a frame average calculator which calculates a frame average of each image frame by using the center point and the plurality of characterizing points in each image frame; and
   a frame comparison value calculator which calculates a frame comparison value for each image frame by using the frame average of each image frame,
   wherein the reference frame selector selects an image frame having the smallest value from among a plurality of frame comparison values for the plurality of image frames, which is the least shaken image frame, as the reference image frame.

5. The reference image setting unit of claim 4, wherein the frame average calculator calculates the frame average of each image frame by averaging distances between the center point and the plurality of characterizing points in each image frame.

6. The image stabilizing apparatus of claim 5, wherein the frame comparison value calculator calculates the plurality of frame comparison values by summing absolute values, which are obtained by subtracting the frame averages of other image frames from the frame average of each image frame.

7. An image stabilizing apparatus comprising:
   the reference image setting unit of claim 1; and
   an image adjusting unit which compares a currently input image frame of an image of the photographed object with the reference image frame, and adjusts the currently input image frame according to a shaken degree of the currently input image frame in view of the reference image frame.

8. The image stabilizing apparatus of claim 7, further comprising:
   a characterizing point checking region setting unit which sets a characterizing point checking region comprising a plurality of characterizing points in the image,
   wherein, in the characterizing point checking region, the image adjusting unit calculates an optical flow, and moves the currently input image frame using the optical flow.

9. The image stabilizing apparatus of claim 8, wherein the characterizing point checking region setting unit comprises:
   a center point detector which detects a representative centroid point of the plurality of image frames; and
   a checking region setting/adjusting unit which sets the characterizing point checking region so that the region comprises the plurality of characterizing points which are greater than or equal to a predetermined level.

10. The image stabilizing apparatus of claim 9, wherein the optical flow comprises a plurality of directions and magnitudes for the plurality of characterizing points, and
   wherein the image adjusting unit calculates a representative direction and magnitude from the plurality of directions and magnitudes, and moves the currently input image frame in a direction opposite to the representative direction by the representative magnitude.

11. An image stabilizing method comprising:
   performing the method of claim 1; and
   comparing a currently input image frame of an image of the photographed object with the reference image frame, and adjusting the currently input image frame according to a shaken degree of the currently input image frame in view of the reference image frame.

12. The method of claim 11, further comprising:
   setting a characterizing point checking region comprising a plurality of characterizing points in the image,
   wherein the adjusting the currently input image frame comprises calculating an optical flow in the characterizing point checking region, and moving the currently input image frame using the optical flow.

13. The method of claim 12, wherein the setting the characterizing point checking region comprises:
   detecting a representative centroid point of the plurality of image frames; and
   setting the characterizing point checking region so that the region comprises the plurality of characterizing points which are greater than or equal to a predetermined level.

14. The method of claim 13, wherein the optical flow comprises a plurality of directions and magnitudes for the plurality of characterizing points,
wherein the calculating the optical flow comprises calculating a representative direction and magnitude from the plurality of directions and magnitudes, and
wherein the moving the currently the moves the currently input image frame in a direction opposite to the representative direction by the representative magnitude.

15. A reference image setting method comprising:
generating, by using a camera, a plurality of image frames by photographing an object for a certain period of time; and
comparing the plurality of image frames with one another based on distances between a center point and a plurality of characterizing points in each image frame, extracting a least shaken image frame from among the plurality of image frames using a result of the comparing, and setting the extracted least shaken image frame as a reference image frame.

16. The method of claim 15, wherein the plurality of image frames are generated by continuously photographing the object.

17. The method of claim 15, wherein the comparing, extracting and setting comprises:
detecting the center point of each image frame of the plurality of image frames;
detecting the plurality of characterizing points in each image frame; and
extracting the least shaken image frame from among the plurality of image frames by analyzing the distances between the center point and the plurality of characterizing points in each image frame.

18. The method of claim 17, wherein the extracting the least shaken image frame comprises:
calculating a frame average of each image frame by using the center point and the plurality of charactering points in each image frame;
calculating a frame comparison value for each image frame by using the frame average of each image frame; and
selecting an image frame having the smallest value from among a plurality of frame comparison values for the plurality of image frames, which is the least shaken image frame, as the reference image frame.

19. The method of claim 18, wherein the calculating the frame average comprises calculating the frame average of each image frame by averaging distances between the center point and the plurality of characterizing points in each image frame.

20. The method of claim 19, wherein the calculating the frame comparison value for each image frame comprises calculating the plurality of frame comparison values by summing absolute values, which are obtained by subtracting the frame averages of other image frames from the frame average of each image frame.

* * * * *